(12) United States Patent
Hayashi et al.

(10) Patent No.: US 7,289,153 B2
(45) Date of Patent: Oct. 30, 2007

(54) SCANNING TYPE IMAGE PICK-UP APPARATUS AND A SCANNING TYPE LASER BEAM RECEIVE APPARATUS

(75) Inventors: Yoshihiko Hayashi, Yokohama (JP); Keizo Fujibayashi, Hiratsuka (JP); Naoki Hosaka, Tokyo (JP); Tetsuo Sado, Kawasaki (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 746 days.

(21) Appl. No.: 10/193,917

(22) Filed: Jul. 15, 2002

(65) Prior Publication Data

US 2002/0191092 A1 Dec. 19, 2002

Related U.S. Application Data

(62) Division of application No. 08/972,015, filed on Nov. 17, 1997, now Pat. No. 6,449,012.

(30) Foreign Application Priority Data

Nov. 19, 1996 (JP) ................... 8-307569
Jun. 23, 1997 (JP) ................... 9-165840

(51) Int. Cl.
*H04N 5/225* (2006.01)
(52) U.S. Cl. ..................................... 348/359
(58) Field of Classification Search ............... 348/369, 348/357, 344, 219.1, 359
See application file for complete search history.

(56) References Cited

U.S. PATENT DOCUMENTS 4,712,142 A * 12/1987 Tomita et al. ............... 358/468
5,049,740 A   9/1991 Pines et al.
5,253,085 A * 10/1993 Maruo et al. ............... 358/481
5,561,460 A * 10/1996 Katoh et al. .............. 348/219.1
5,754,226 A *  5/1998 Yamada et al. ........... 348/219.1
5,877,806 A *  3/1999 Kawano ................... 348/219.1
5,969,757 A * 10/1999 Okada et al. ............ 348/219.1
6,018,363 A *  1/2000 Horii ....................... 348/219.1

(Continued)

FOREIGN PATENT DOCUMENTS

EP      0 050 970      5/1982

(Continued)

Primary Examiner—Lin Ye
Assistant Examiner—James M. Hannett
(74) Attorney, Agent, or Firm—Oblon, Spivak, McClelland, Maier & Neustadt, P.C.

(57) ABSTRACT

The present invention has an object of realizing highly reliable search with high precision by obtaining a clear view image over a wide view. In particular, a reflection mirror is formed so as to correspond to an image pick-up element at a focus surface of a converging lens of an image pick-up camera and the image pick-up camera is arranged to be capable of freely performing scanning by a scanning mechanism portion. As a result, with the image pick-up camera kept performing linear scanning, the reflection mirror performs triangular scanning in a direction opposite to the scanning direction of the image pick-up camera for every frame cycle T and a light wave taken in by the converging lens is introduced to the image pick-up element for every one frame, thereby to obtain a static view image. The desired object is thus achieved.

8 Claims, 6 Drawing Sheets

U.S. PATENT DOCUMENTS

| | | | |
|---|---|---|---|
| 6,163,348 A * | 12/2000 | Izumi et al. | 348/761 |
| 6,181,378 B1 * | 1/2001 | Horie et al. | 348/353 |
| 6,181,379 B1 * | 1/2001 | Kingetsu et al. | 348/364 |
| 6,233,014 B1 * | 5/2001 | Ochi et al. | 348/324 |
| 6,335,758 B1 * | 1/2002 | Ochi et al. | 348/335 |

FOREIGN PATENT DOCUMENTS

| | | |
|---|---|---|
| EP | 0 132 109 | 1/1985 |
| JP | 8-304523 | 11/1996 |

* cited by examiner

SCANNING TYPE IMAGE PICK-UP APPARATUS AND A SCANNING TYPE LASER BEAM RECEIVE APPARATUS

CROSS-REFERENCE TO RELATED APPLICATION

This application claims benefit of priority under 35 U.S.C. 120 to U.S. application Ser. No. 08/972,015 filed Nov. 17, 1997, the entire contents of which are incorporated by reference herein.

BACKGROUND OF THE INVENTION

The present invention relates to a scanning type image pick-up apparatus and a scanning type laser beam receive apparatus suitable for passively or actively scanning a wide view-field by a two-dimensional manner.

In general, in this kind of scanning type image pick-up apparatus, an image pick-up camera internally including an image pick-up element of a charge storing type is used to obtain a light wave. In this image pick-up camera, the image pick-up element has a view angle θ and therefore, a method of scanning a search range to take in a the view image is adopted in case of searching a wide view.

In the image pick-up camera as described above, the image pick-up element is provided at a focus position of an optical system, and image data is obtained by taking in light waves of a visible region (e.g., 0.4 μm to 0.8 μm) and an infrared region (e.g., 3 μm to 12 μm) received by the optical system and performing photoelectric conversion thereon. Therefore, if an angle range equivalent to an instant view angle of one pixel of the image pick-up element is scanned in one direction at a speed faster than the speed at which the image pick-up element is exposed, a so-called image flow is caused and the view image obtained thereby becomes unclear.

Therefore, a conventional scanning type image pick-up apparatus adopts a reflection mirror step scanning method in which a reflection mirror is provided before an image pick-up camera and the reflection mirror is scanned in steps for every unit angle equivalent to a view angle in synchronism with the frame time of the image pick-up element, thereby to pick up light waves into an image pick-up element within one flame time (or exposure time) and to obtain a view image, or a camera step scanning method in which an image pick-up camera directly performs scanning in steps, thereby to pick up light waves into an image pick-up element within one frame time (or exposure time) and to obtain a view image.

However, if the scanning type image pick-up apparatus as described above is constructed so as to have a wide view range, a large reflection mirror is required from the limitations of the focal distance and the image pick-up distance, in case of the former method, and an optical system such as a converging lens must be a large size, in case of the latter method. Thus, in both cases, the apparatus has a very heavy weight. Therefore, in any of these methods, a large driving force is required for step scanning, and a time delay occurs when scanning is started, so that it is difficult to obtain stable view images.

For example, since a reflection mirror or an image pick-up camera has a large size and a heavy weight, it is very difficult to perform step scanning with a high speed of about an image pick-up element frame frequency 60 Hz and a frame cycle 16.7 ms, and therefore, a problem occurs in that a clear image is difficult to obtain. The same problem occurs in case of a scanning type laser beam receive apparatus.

BRIEF SUMMARY OF THE INVENTION

As has been explained above, a conventional scanning type image pick-up apparatus has a problem in that it is difficult to obtain a clear view image when search over a wide view is realized.

The present invention has been made in view of the above situation, and has an object of providing a scanning type image pick-up apparatus and a laser beam receive apparatus which obtain a clear view image over a wide view to realize highly reliable search with high precision.

A scanning type image pick-up apparatus comprising: an image pick-up camera for converging a light wave by a first optical system, changing an optical path of the light wave by a second optical system, and taking in the light wave into a charge storage type image pick-up element, thereby to obtain a view image, the second optical system being arranged to be capable of freely performing scanning on the image pick-up element with the light wave from the first optical system; camera scanning means for causing the image pick-up camera to linearly scan a view range, thereby to take in the light wave into the first optical system; and first optical system scanning means for causing the second optical system of the image pick-up camera to perform triangular scanning in a direction opposite to a scanning direction of the image pick-up camera for every frame cycle of the image pick-up camera, thereby to introduce the light wave converged by the first optical system into the image pick-up element.

A scanning type image pick-up apparatus comprising: an image pick-up camera for converging a light wave by a first optical system, changing an optical path of the light wave by a second optical system, and taking in the light wave into a charge storage type image pick-up element, thereby to obtain a view image, the second optical system being arranged to be capable of freely performing scanning so as to correspond to the first optical system and the image pick-up element; camera scanning means for causing the image pick-up camera to linearly scan a view range, thereby to take in the light wave into the first optical system; and a rotation mechanism for rotating the second optical system of the image pick-up camera around an optical axis by an angle decided by scanning angle speeds in two axial directions of the two-dimensional scanning means and around an axis parallel to an incidence surface of the image pick-up element at an angle speed decided by scanning angle speeds in the two axial directions of the two-dimensional scanning means.

In addition, a scanning type laser beam receive apparatus comprising: a laser radar for converging a laser beam by a first optical system, for changing an optical path of the laser beam by a second optical system, and for taking in the laser beam into a laser beam receiver, thereby to obtain a view image, the second optical system being arranged to be capable of freely performing scanning so as to correspond to the first optical system and the laser beam receiver; and two-dimensional scanning means for causing the laser radar to linearly scan a view range, thereby to take in the laser beam into the first optical system, characterized in that the second optical system of the laser radar includes a mechanism which rotates the second optical system around an optical axis by an angle decided by scanning angle speed in two axial directions of the two-dimensional scanning means and around an axis parallel to a light receive surface of the laser beam receiver at an angle speed decided by scanning angle speeds in the two axial directions of the two-dimensional scanning means.

Another a scanning type image pick-up apparatus characterized by comprising: an image pick-up camera for converging a light wave by a first optical system, for changing an optical path of the light wave by a second optical system, and for taking in the light wave into a charge storage type image pick-up element, thereby to obtain a view image, the second optical system being arranged to be capable of freely performing scanning with use of an electro-optical deflector capable of electrically deflecting the light wave so as to correspond to the first optical system and the image pick-up element; scanning means for causing the image pick-up camera to linearly scan a view range, thereby to take in the light wave into the first optical system; and deflector drive means for causing the electro-optical deflector to deflect an optical axis at an angle decided by a scanning angle speed of the scanning means.

Or, another a scanning type image pick-up apparatus characterized by comprising: an image pick-up camera for converging a light wave by a first optical system, for changing an optical path of the light wave by a second optical system, and for taking in the light wave into a charge storage type image pick-up element, thereby to obtain a view image, the second optical system being arranged to be capable of freely performing scanning in a two-dimensional direction with use of first and second electro-optical deflectors respectively capable of electrically deflecting the light wave in directions perpendicular to each other so as to correspond to the first optical system and the image pick-up element; two-dimensional scanning means for causing the image pick-up camera to linearly scan a view range, thereby to take in the light wave into the first optical system; first deflector drive means for causing the first electro-optical deflector to deflect an optical axis at an angle decided by a scanning angle speed of the two-dimensional scanning means in a first axial direction thereof; and second deflector drive means for causing the second electro-optical deflector to deflect an optical axis at an angle decided by a scanning angle speed of the two-dimensional scanning means in a second axial direction thereof perpendicular to the first axial direction.

Or, another a scanning type image pick-up apparatus characterized by comprising: an image pick-up camera for converging a light wave by a first optical system, for changing an optical path of the light wave by a second optical system, and for taking in the light wave into a charge storage type image pick-up element, thereby to obtain a view image, the second optical system being arranged to be capable of freely performing scanning in a two-dimensional direction with use of an electro-optical deflector capable of electrically deflecting the light wave so as to correspond to the first optical system and the image pick-up element and with use of a rotation mechanism for rotating the electro-optical deflector around an optical axis; two-dimensional scanning means for causing the image pick-up camera to linearly scan a view range, thereby to take in the light wave into the first optical system; and deflector drive means for rotating the electro-optical deflector around an optical axis by an angle decided by scanning angle speeds of the two-dimensional scanning means in two axial directions thereof, with respect to the rotation mechanism of the image pick-up camera, and for causing the electro-optical deflector to deflect an optical axis around an axis parallel to a surface of the image pick-up element at an angle speed decided by the scanning angle speeds of the two-dimensional scanning means in the two axial directions thereof.

Another a scanning type laser beam receive apparatus characterized by comprising: a laser radar for converging a laser beam by a first optical system, for changing an optical path of the laser beam by a second optical system, and for taking in the laser beam into a laser beam receiver, thereby to obtain a view image, the second optical system being arranged to be capable of freely performing scanning with use of an electro-optical deflector capable of electrically deflecting the laser beam so as to correspond to the first optical system and the laser beam receiver; scanning means for causing the laser radar to linearly scan a view range, thereby to take in the laser beam into the first optical system; and deflector drive means for causing the electro-optical deflector to deflect an optical axis at an angle decided by a scanning angle speed of the scanning means.

Or, another a scanning type laser beam receive apparatus characterized by comprising: a laser radar for converging a laser beam by a first optical system, for changing an optical path of the laser beam by a second optical system, and for taking in the laser beam into a laser beam receiver, thereby to obtain a view image, the second optical system being arranged to be capable of freely performing scanning in a two-dimensional direction with use of first and second electro-optical deflectors respectively capable of electrically deflecting the laser beam in directions perpendicular to each other so as to correspond to the first optical system and the laser beam receiver; two-dimensional scanning means for causing the laser radar to linearly scan a view range, thereby to take in the laser beam into the first optical system; first deflector drive means for causing the first electro-optical deflector to deflect an optical axis at an angle decided by a scanning angle speed of the two-dimensional scanning means in a first axial direction thereof; and second deflector drive means for causing the second electro-optical deflector to deflect an optical axis at an angle decided by a scanning angle speed of the two-dimensional scanning means in a second axial direction thereof perpendicular to the first axial direction.

Or another a scanning type laser beam receive apparatus characterized by comprising: a laser radar for converging a light wave by a first optical system, for changing an optical path of the laser beam by a second optical system, and for taking in the laser beam into a laser beam receiver, thereby to obtain a view image, the second optical system being arranged to be capable of freely performing scanning in a two-dimensional direction with use of an electro-optical deflector capable of electrically deflecting the laser beam so as to correspond to the first optical system and the laser beam receiver and with use of a rotation mechanism for rotating the electro-optical deflector around an optical axis; two-dimensional scanning means for causing the laser radar to linearly scan a view range, thereby to take in the laser beam into the first optical system; and deflector drive means for rotating the electro-optical deflector around an optical axis by an angle decided by scanning angle speeds of the two-dimensional scanning means in two axial directions thereof, with respect to the rotation mechanism of the laser radar, and for causing the electro-optical deflector to deflect an optical axis around an axis parallel to a surface of the laser radar at an angle speed decided by the scanning angle speeds of the two-dimensional scanning means in the two axial directions thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

In the following, embodiments of the present invention will be explained with reference to the drawings.

Firstly, the basic structure of a scanning type image pick-up apparatus according to the present invention will be explained with reference to FIG. 1.

Figure 1:
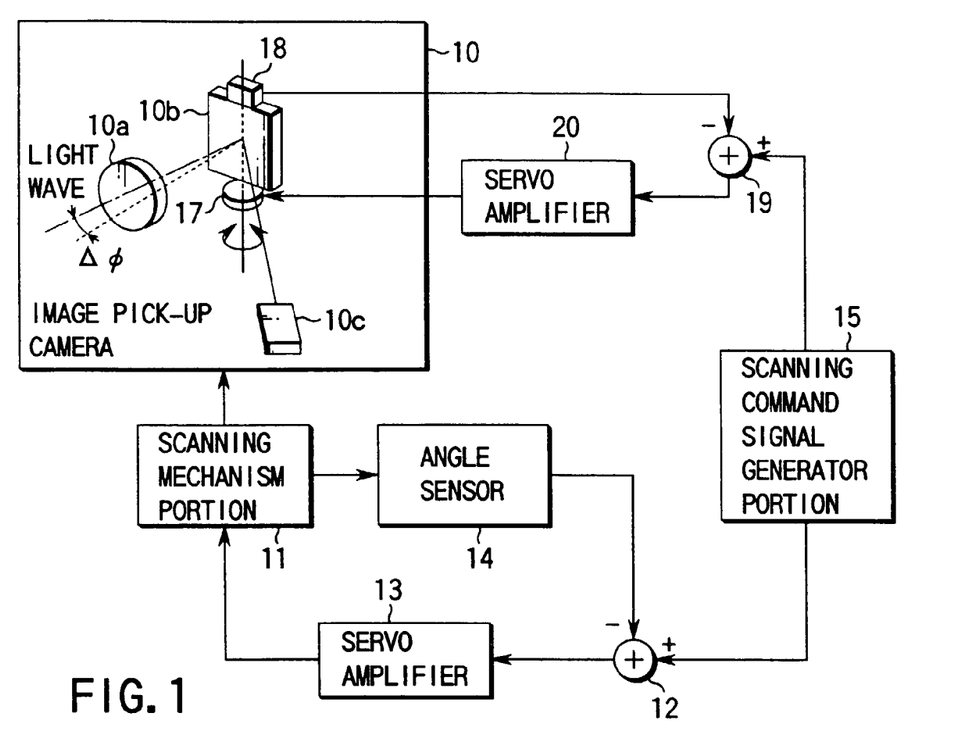
FIG. 1 is a block diagram showing a basic structure of a scanning type image pick-up apparatus adopting the present invention.
Figure 2:
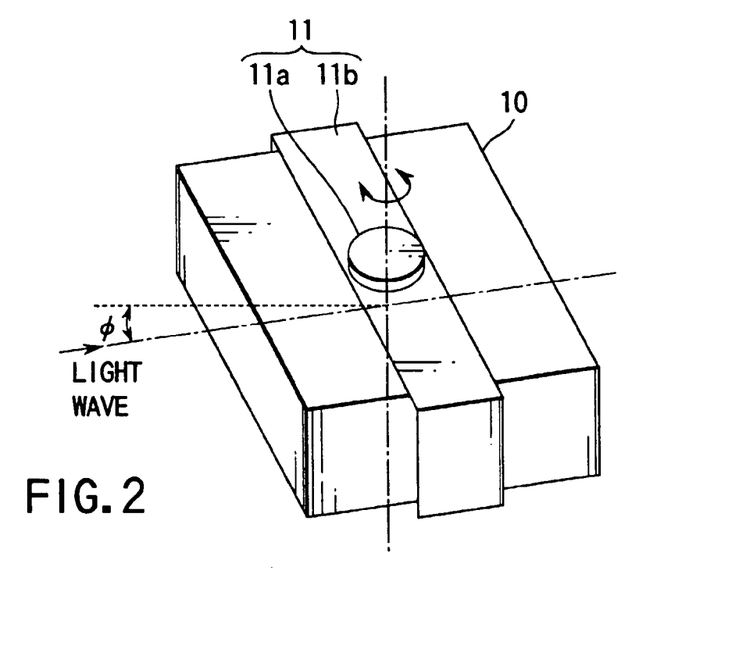
FIG. 2 is a perspective view showing a specific structure of a reflection mirror rotation mechanism used for the scanning apparatus shown in FIG. 1.

In FIG. 1, an image pick-up camera 10 for picking up light waves is mounted on a scanning mechanism portion 11 and is arranged to be capable of freely scanning one axial direction (e.g., azimuth direction) by the scanning mechanism portion 11. The light waves are those included in a visible region described above (e.g., 0.4 µm to 0.8 µm) and an infrared region (e.g., 3 µm to 12 µm).

The scanning mechanism portion 11 described above comprises a torquer 11a and a gimbal mechanism 11b. The scanning mechanism portion 11 has an input end connected with an output end of an adder 12 through a servo amplifier 13. The adder 12 has a minus input end connected with an output end of an angle sensor 14 and is inputted with a scanning angle signal of the scanning mechanism portion 11 through the angle sensor 14. Further, the adder 12 has a plus input end connected with a camera scanning command signal output end of a scanning command signal generator portion 15.

Figure 3A:
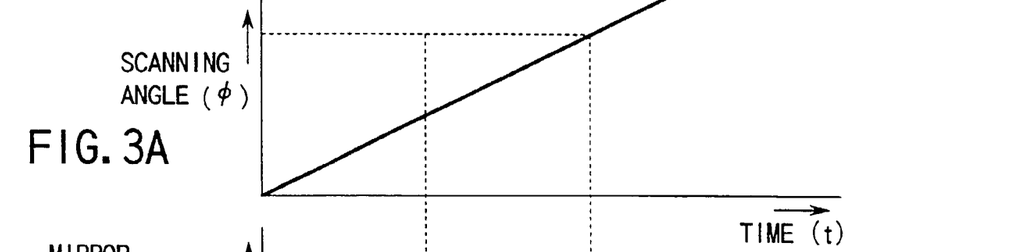
FIGS. 3A to 3F are timing charts showing timing waveforms for explaining operation of the scanning type image pick-up apparatus shown in FIG. 1.

Specifically, the adder 12 generates a camera drive signal by obtaining a difference between a camera scanning command signal (i.e., a signal for instructing a scanning angle of an image pick-up camera 10) outputted from the scanning command generator portion 15 and an actual scanning angle signal from an angle sensor 14, and outputs the camera drive signal to the scanning mechanism portion 11 through the servo amplifier 13. The scanning mechanism portion 11 controls the scanning angle φ of the image pick-up camera 10 to be linear on the basis of the camera drive signal inputted (ref. FIG. 3).

The image pick-up camera 10 is constructed as a combination of a converging lens 10a, a reflection mirror 10b, and a charge storage type image pick-up element 10c having a view angle θ. A light wave picked up is converged by the converging lens 10a and the light wave thus converged is imaged on the image pick-up element 10c through the reflection mirror 10b, thus obtaining a static view image.

Here, the reflection mirror 10b is provided to be capable of freely performing triangular scanning in a camera scanning direction by a mirror scanning drive portion 17 in correspondence with the focusing surface of the converging lens 10a, and the light wave converged by the converging lens 10a is imaged on the image pick-up element 10c. The reflection mirror 10b is equipped with an angle sensor 18, and an output end of the angle sensor 18 is connected with a minus input end of an adder 19. A plus input end of the adder 19 is connected with a mirror scanning command signal output end of the scanning command signal generator portion 15.

Figure 3B:
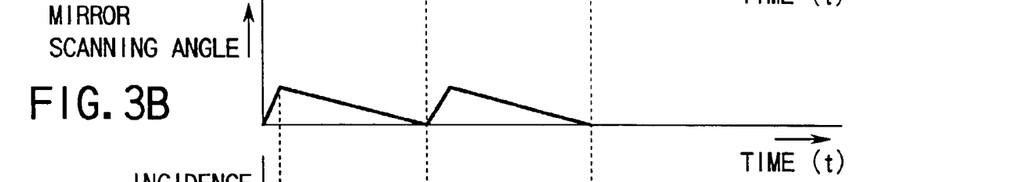

Specifically, the adder 19 generates a mirror drive signal by obtaining a difference between a mirror scanning command signal (or a signal for instructing a triangular scanning angle of the reflection mirror 10b) from the scanning command signal generator portion 15 and an actual mirror angle signal from the angle sensor 18, and outputs the mirror drive signal through a servo amplifier 20 to the mirror scanning mechanism portion 17 described above. The mirror scanning mechanism portion 17 causes the reflection mirror 10b to perform triangular scanning or so-called swing scanning in the direction opposite to the camera scanning direction, on the basis of the mirror drive signal inputted (ref. FIG. 3B).

Figure 3C:
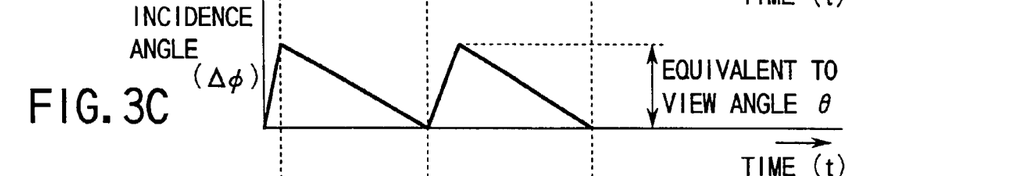
Figure 3D:
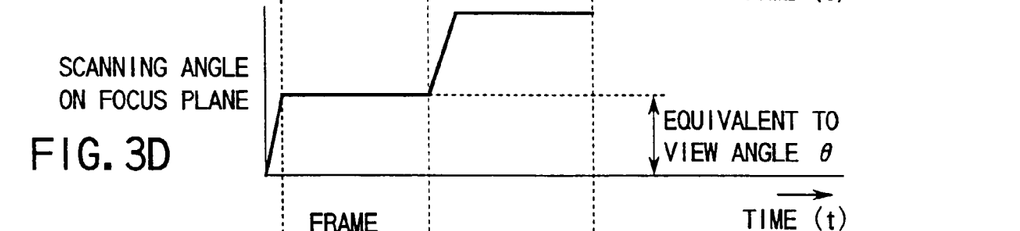
Figure 3E:
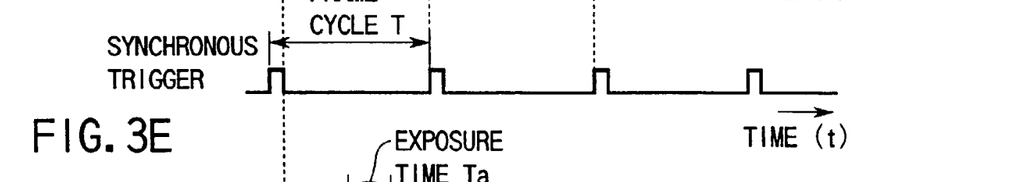
Figure 3F:
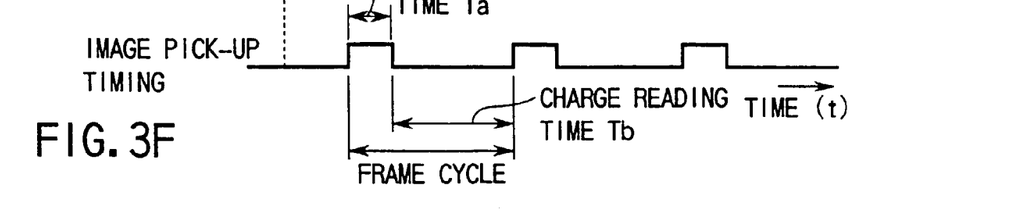

Here, a light wave enters into the image pick-up element 10c at an incidence angleΔφ (ref. FIGS. 3C and 3D), and a desired view angle O is maintained. Simultaneously, the image pick-up element 10c is controlled by a synchronous trigger for every frame cycle T, and exposure of an optical image and charge reading operation are carried out (ref. FIGS. 3E and 3F), so that a static view image is obtained.

The scanning command signal generator portion 15 generates a camera scanning command signal for causing the image pick-up camera 10 to perform scanning and a mirror scanning command signal for causing the reflection mirror 10b to perform scanning, on the basis of a command signal not shown, as described above.

In the structure as described above, for example, where the view angle is set to 3° and the frame frequency and the frame cycle are 60 Hz and T (1/60) s (1.67 ms), the scanning command signal generator portion 15 generates such a camera scanning command signal which causes the image pick-up camera 10 to scan one direction (e.g., the azimuth direction) at an angle speed of 3°/(1/60)=180° and the portion 15 outputs the camera scanning command signal to the adder 12. The adder obtains a difference between the camera scanning command signal and a camera angle signal from an angle sensor 14, to generates a camera drive signal, and controls and drives a scanning mechanism portion 11 through a servo amplifier 13. In this manner, the image pick-up camera 10 is controlled so as to scan one direction (e.g., the azimuth direction) at an angle speed of 3°/(1/60) =180° within a view, and light waves are picked up by a converging lens 10a.

Simultaneously, the scanning command signal generator portion 15 generates a mirror scanning command signal which causes the reflection 10b of the image pick-up camera 10 to perform triangular scanning in a direction opposite to the camera scanning direction at an angle speed of ½ of 180°/s in synchronism with a synchronous trigger of a frame cycle T of the image approximately for every 1/60 s (e.g., 16 ms), and outputs the mirror scanning command signal to the adder 19. The adder obtains a difference between the scanning command signal and a mirror angle signal from the angle sensor 18, to generate a mirror drive signal, and controls and drives the mirror scanning mechanism portion 17 through the servo amplifier 20. In this manner, the reflection mirror 10b performs triangular scanning at an angle speed of ½ of 180° in the direction opposite to the camera scanning direction in synchronism with a synchronous trigger of a frame cycle T of the image pick-up element 10c approximately for every 1/60 s (e.g., 16 ms), and light waves converged by the converging lens 10a are introduced at an incidence angle$\Delta\phi$, to form an image.

The image pick-up element 10c maintains a desired exposure time Ta so that a desired charge reading time Tb is maintained thereby to attain a static view image at a view angle O.

In case of scanning a direction substantially perpendicular to the scanning direction on condition that the image pick-up camera 10 has completed scanning in one direction, for example, the image pick-up camera 10 together with the scanning mechanism portion 11 is caused to scan this direction and the image pick-up camera 10 and the reflection mirror 10b repeat scanning in the same manner as described above, thereby to obtain a static view image. The time at which scanning is performed in the direction substantially perpendicular to the scanning direction is set within the charge reading time Tb.

Thus, the image pick-up apparatus described above is arranged such that the reflection mirror 10b is formed on the focus plane of the converging lens 10a of the image pick-up camera 10 so as to freely perform scanning in correspondence with the image pick-up element 10c and such that the image pick-up camera 10 is arranged so as to freely perform scanning through the image pick-up camera 10. In this manner, with the image pick-up camera 10 kept performing linear scanning, the reflection mirror 10b is caused to perform triangular scanning the direction opposite to the scanning direction of the image pick-up camera 1 for every frame cycle T of the image pick-up element 10c, and light waves picked up by the converging lens 10a are introduced into the image pick-up element 10c for every frame, thereby to obtain a static view image.

As a result, since only the reflection mirror 10b having a relatively small size enough to take in an image formed on the focus plane of the converging lens 10a into the image pick-up element 10c needs to perform scanning in correspondence with the image pick-up camera 10, secure operation control for obtaining image data can be easily realized within a view angle of the image pick-up element 10. Therefore, a clear precise static image can be securely obtained within a wide view picked up by the image pick-up camera 10.

In addition, in this manner, as the sensitivity of the image pick-up element 10 is raised to be high, it is possible to obtain a clear static view image which match with such a high sensitivity. Therefore, sensitivity performance of the image pick-up element 10 can be effectively used.

Note that the above embodiment describes a case in which the image pick-up camera 10 is arranged so as to freely scan one axial direction with use of the scanning mechanism portion 11. However, the scanning mechanism potion 11 may be constructed so as to scan two axial directions substantially perpendicular to each other, e.g., the azimuth direction and the elevation direction, and the image pick-up camera 10 itself may be constructed so as to scan two directions substantially perpendicular to each other.

Further, the above embodiment has been explained as a case in which the reflection mirror 10b is provided in the image pick-up camera 10 so as to perform scanning freely and light waves converged by the converging lens 10a are reflected by the reflection mirror 10b so as to form an optical image on the image pick-up camera 10. However, an optical phase member such as an optical phase shifter or the like which makes light waves passing and set in a phase may be provided on the focus plane of the converging lens 10a, and light waves converged by the converging lens 10a may be introduced to the image pick-up element 10c through the optical phase member. In this case, substantially, the same effects as obtained in the above embodiment can be expected.

In the structure shown in FIG. 1, the rotation (or swing) shaft of the reflection mirror 10b for restricting an image flow must be set in parallel with one scanning axis of the entire image pick-up camera 10, and therefore, operation of restricting an image flow cannot be performed in the other direction. For example, this means that the axis of the reflection mirror 10b is set in parallel with one of two scanning axes when two axes of a horizontal direction and a vertical direction are adopted for search scanning, and the scanning direction vertical to the axis of the reflection mirror 10b is the main scanning direction. For example, when search scanning is performed in an obliquely upward direction, horizontal components of an image flow can be restricted and vertical components of an image flow cannot be restricted. This is a main problem to be solved by the present invention.

Figure 4:
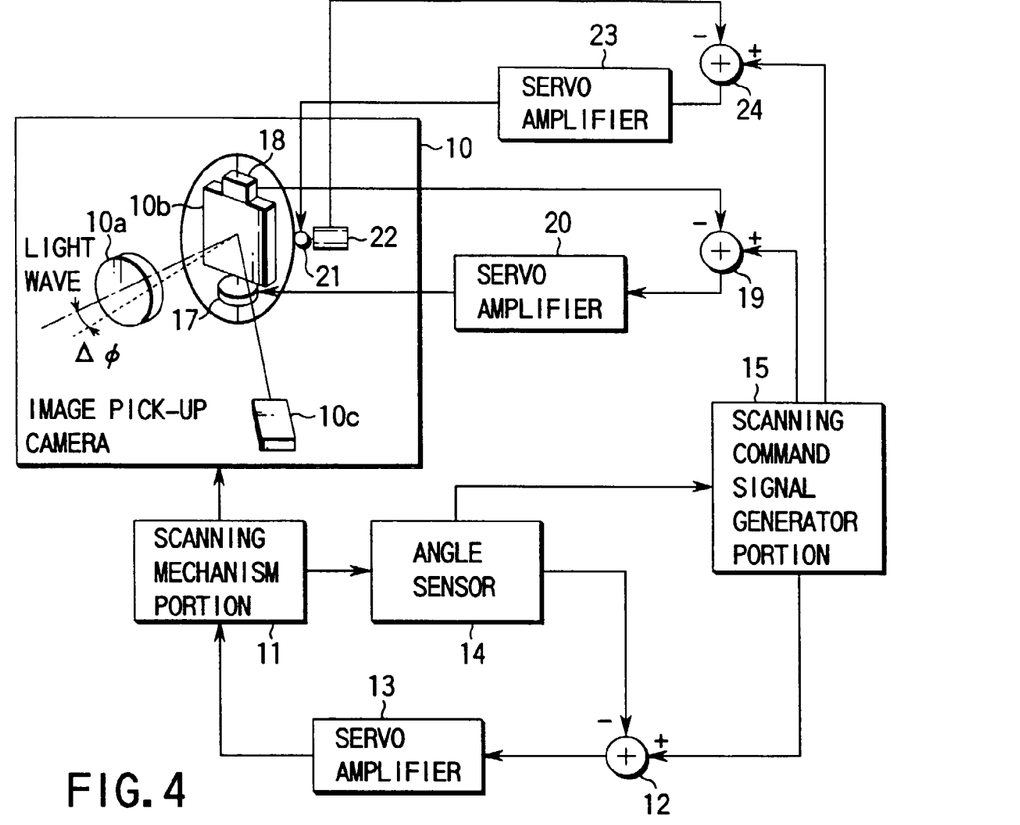
FIG. 4 is a block diagram showing a structure of a first embodiment of a scanning type image pick-up apparatus according to the present invention.

FIG. 4 shows a structure of a first embodiment of a scanning type image pick-up apparatus according to the present invention. Note that those components of FIG. 4 which are the same as those of FIG. 1 are referred to by the same reference symbols and only those components of FIG. 4 which are different from those of FIG. 1 will now be described in detail below.

In FIG. 4, an image pick-up camera 10 is mounted on a scanning mechanism portion 11 and is caused to scan an arbitrary direction decided by synthesizing two-dimensional directions (e.g., the horizontal direction and the vertical direction) by the scanning mechanism portion 11.

The scanning mechanism portion 11 is equipped with an angle sensor (or angle speed sensor) 14 and a servo amplifier 13 with respect to two axes to be scanned. An image pick-up camera is caused to scan arbitrary vertical and horizontal directions by a camera scanning command signal from a scanning command signal generator portion 15 to an adder 12.

Meanwhile, the image pick-up camera 10 introduces light waves passing through a converging lens 10a, to a reflection mirror 10b. The reflection mirror 10b is equipped with an angle sensor 18 and a mirror scanning mechanism portion 17 which is caused to perform scanning (i.e., reverse scanning) in a direction opposite to the scanning direction of the image pick-up camera 10. The scanning command signal generator portion 15 supplies a signal to the adder 19, thereby to drive the mirror scanning mechanism portion 17. The scanning command signal generator portion 15 takes in an angle and an angle speed from the angle sensor 14, to control the angle of reverse scanning and the angle of the axis.

Figure 5:
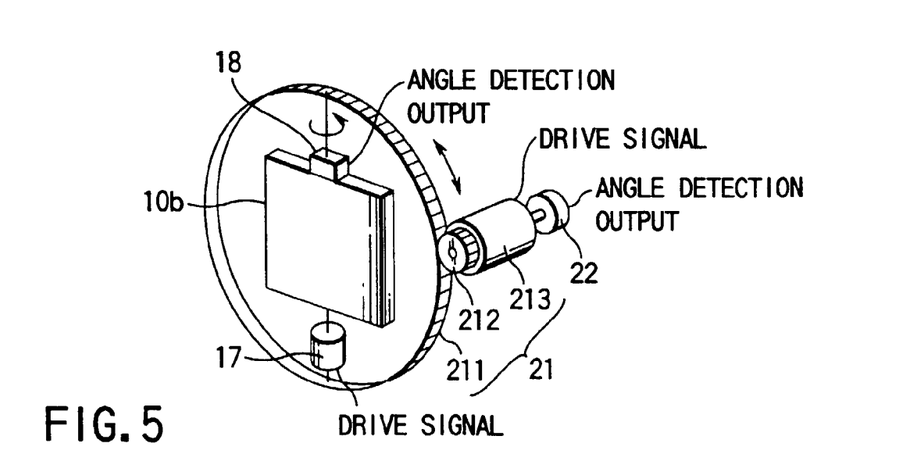
FIG. 5 is a perspective view showing a specific structure of a reflection mirror rotation mechanism used in the embodiment.

Further, the reflection mirror 10b is provided with a rotation mechanism 21 around an optical axis and an angle sensor 22, together with the mirror scanning drive portion 17 and the angle sensor 18. Specifically, the rotation mechanism 21 is constructed by rotatably fixing a scanning drive shaft to a ring 211 and by rotating the ring 211 by rotating a motor 213 through a transmission member 212 such as a gear or the like. In this case, the angle sensor 22 may be equipped on the rotation shaft of the motor 213. In this manner, the reflection mirror 10b is capable of changing the axis of the reverse scanning on the basis of a signal from the scanning command signal generator portion 15, like triangular scanning.

Specifically, a command signal for instructing a mirror scanning angle outputted from the scanning command signal generator portion 15 is converted into a drive signal by a servo amplifier 23, and the rotation mechanism 21 is driven on the basis of the drive signal. When the reverse scanning axis of the reflection mirror 10b is inclined as a result, the inclination angle is detected by an angle sensor 22 and is inputted to a minus input end of an adder 24. The adder 24 carries out a subtraction by reducing an output angle of the angle sensor 22 from an angle specified by the mirror scanning command signal inputted to a plus input end of this adder. In this manner, the reverse scanning axis of the reflection mirror 10b is set to an inclination angle corresponding to the command signal.

Examples of calculating an angle by which the scanning axis of the reflection mirror 10b should be rotated and an angle speed of the reverse scanning will be described below. For example, where the scanning directions of the image pick-up camera 10 are the horizontal and vertical directions and the reference scanning direction of the reflection mirror 10b is the horizontal direction, the angle by which the scanning axis of the reflection mirror 10b should be rotated is expressed as follows.

$$\theta = \tan^{-1}(\omega v / \omega h)$$

The angle speed of the reverse scanning is expressed as follows.

$$\omega = \sqrt{\omega v^2 + \omega h^2}$$

Here, $\omega v$ is a scanning angle speed in a vertical direction and $\omega h$ is a scanning angle speed in a horizontal direction.

Note that it is apparent that refraction depending on a parallel optical plate may be used although a reflection mirror 10b is shown in the present embodiment. In addition, although frequencies of light waves are not limited, it is apparent that the present invention is applicable to overall light waves including ultraviolet light waves, visible light waves, infrared light waves, and the like. Further, in case of applying the present invention to a scanning type laser beam receive apparatus, the image pick-up camera 10 may be replaced with a laser radar. In this case, a laser beam receiver may be used in place of the image pick-up element 10c.

In the structure of the embodiment described above, it is necessary to drive mechanically the reflection mirror, mechanical limitations cannot be avoided, e.g., the adjustable scanning angle speed is limited and the adjustable direction is limited to only one direction. In the following embodiment, this problem will be solved.

Figure 6:
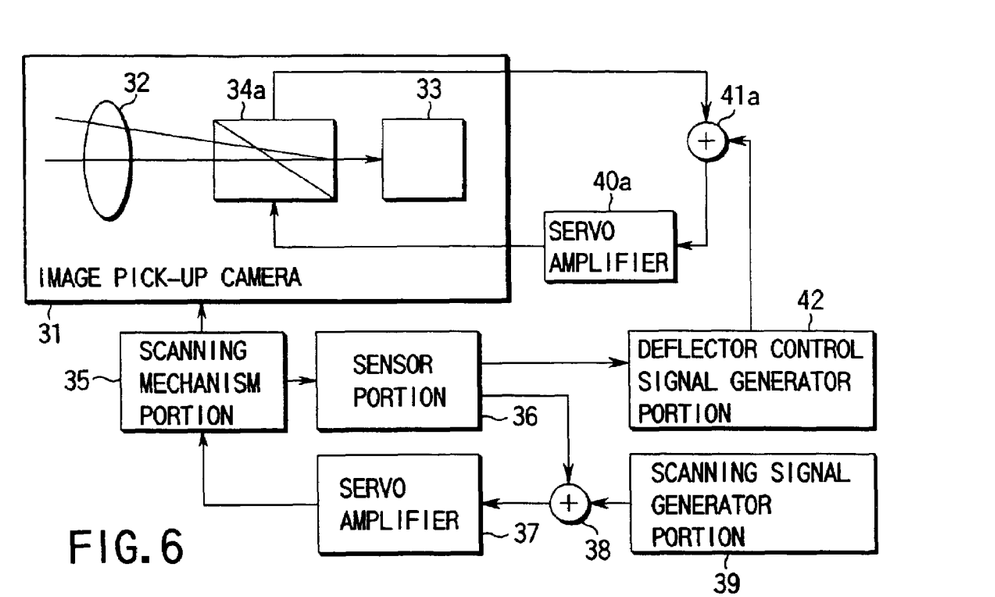
FIG. 6 is a block diagram showing a structure of a second embodiment of a scanning type image pick-up apparatus according to the present invention.

FIG. 6 shows a structure of a second embodiment of a scanning image pick-up apparatus according to the present invention. In FIG. 6, an image pick-up camera 31 for taking in a light wave is mounted on a scanning mechanism portion 35 and is provided so as to freely scan one axial direction (e.g., an azimuth direction) through the scanning mechanism portion 35. A sensor portion 36 is provided on the scanning axis. The light waves adopted are those in a visible region (e.g., a range of 0.4 µm to 0.8 µm) and an infrared region (e.g., a range of 3 µm to 12 µm).

The above scanning mechanism portion 35 comprises a torquer and a gimbal mechanism and has an input end connected with an output end of an adder 38 through a servo amplifier 37. The adder 38 has a plus input end connected with a camera scanning command signal output end of a scanning command signal generator portion 39.

Figure 7A:
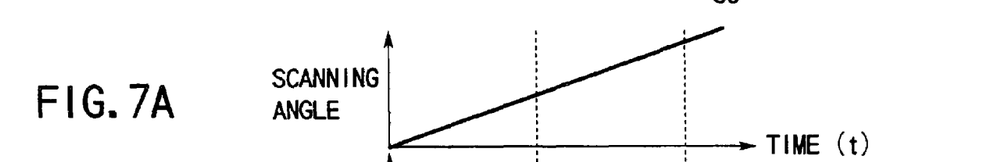
FIGS. 7A to 7E are timing charts showing relationships of control timings between scanning angles, light deflection angles, and the like of the second embodiment.
Figure 7B:
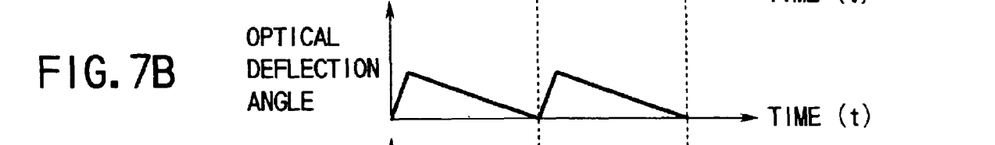

Specifically, the adder 38 generates a camera drive signal by obtaining a difference between a camera scanning command signal (e.g., a signal for instructing a scanning angle of the image pick-up camera 31) outputted from the scanning command signal generator portion 39 and an actual scanning angle signal from the sensor portion 36, and outputs the camera drive signal to the scanning mechanism portion 35. The scanning mechanism portion 35 controls the scanning angle φ of the image pick-up camera 31 on the basis of a camera drive signal inputted, such that scanning is performed linearly (ref. FIG. 7A).

The image pick-up camera 31 is constructed by arranging a converging lens 32, an electro-optical deflector 34a, and a charge storage type image pick-up element 33 having a view angle θ on an optical axis. Light waves picked up are converged by the converging lens 32 and the converged light waves are imaged on the image pick-up element 33 through the electro-optical deflector 34a, thereby to obtain a static view image.

Here, the electro-optical deflector 34a has a structure in which a plurality of prisms made of electro-optical crystal having a so-called electro-optical effect that the refraction factor is changed by applying an electric field are adhered on each other such that optical axes of the prisms are inverted one another. When a light wave enters into the deflector 34a applied with a uniform electric field, the light wave is deflected and injected out. The deflection amount can be expressed in form of a function concerning an applied electric field. This means that the deflection amount can be controlled by an applied voltage.

Figures 7C, 7D:
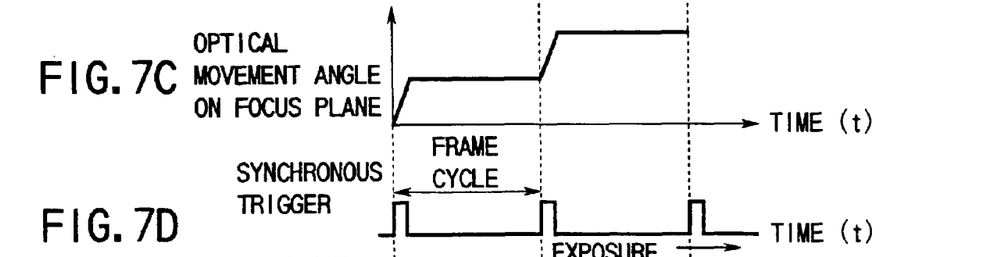
Figure 7E:
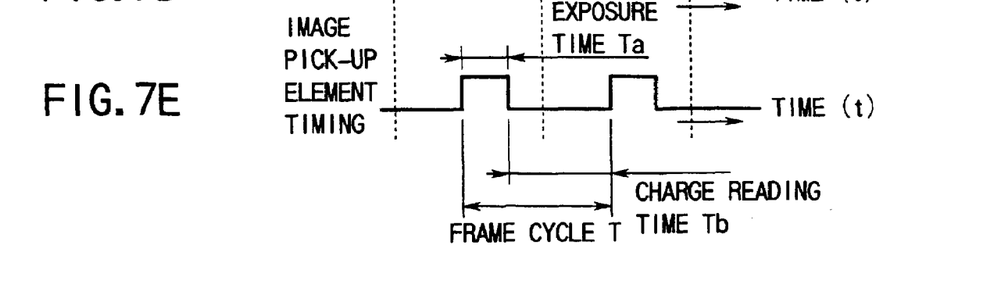

In this apparatus, therefore, the angle speed in a scanning direction obtained by the sensor portion 36 is inputted into a deflector control signal generator portion 42, thereby to generates a control signal (or angle command signal) corresponding to a return angle equivalent to an angle movement amount. The control signal is converted into a drive voltage by the servo amplifier 40a through the adder 41a and is supplied to the electro-optical deflector 34a. A voltage change caused by deflection by the electro-optical deflector 34a is returned and inputted into the adder 41a, thereby to perform deflection corresponding to an angle specified by the control signal.

Where the frame cycle T, exposure time Ta, and charge reading time Tb of the image pick-up element 33 are set as shown in FIG. 6E, the optical deflection angle can be returned in the reverse direction by an angle equivalent to a scanning angle at the frame cycle, as shown in FIG. 7D, when a synchronous trigger corresponding to the frame cycle T is supplied to the deflector control signal generator portion 42 at a timing shown in FIG. 7D. Therefore, the light movement angle on the focus plane of the image pick-up element 33 is constant at the portion of the exposure time Ta, as shown in FIG. 7C, and a static image is thereby obtained, so that a function equivalent to rotation control of a reflection mirror as described before can be realized.

Thus, according to the structure of the present embodiment, an angle speed detection output from the sensor portion 36 set on a scanning axis (or rotation axis) is used as a feed back signal to the electro-optical deflector 34a, and therefore, a return angle equivalent to an angle movement amount depending on scanning by the image pick-up camera 31 can be supplied to the electro-optical deflector 34a. Specifically, an image flow caused by scanning can be equivalently restricted and an image during an exposure time can be stopped statically.

Also in the present embodiment, the image pick-up camera 31 may be replaced with a laser radar and a laser beam receiver may be used in place of the image pick-up element in case of applying the present invention to a scanning type laser beam receive apparatus.

Although an image flow only in the horizontal direction or the vertical direction can be prevented by using one electro-optical deflector, as described above, prevention of an image flow in case of simultaneous scanning (or two-dimensional scanning) in both the horizontal and vertical directions can be realized by the following third and fourth embodiments.

Figure 8:
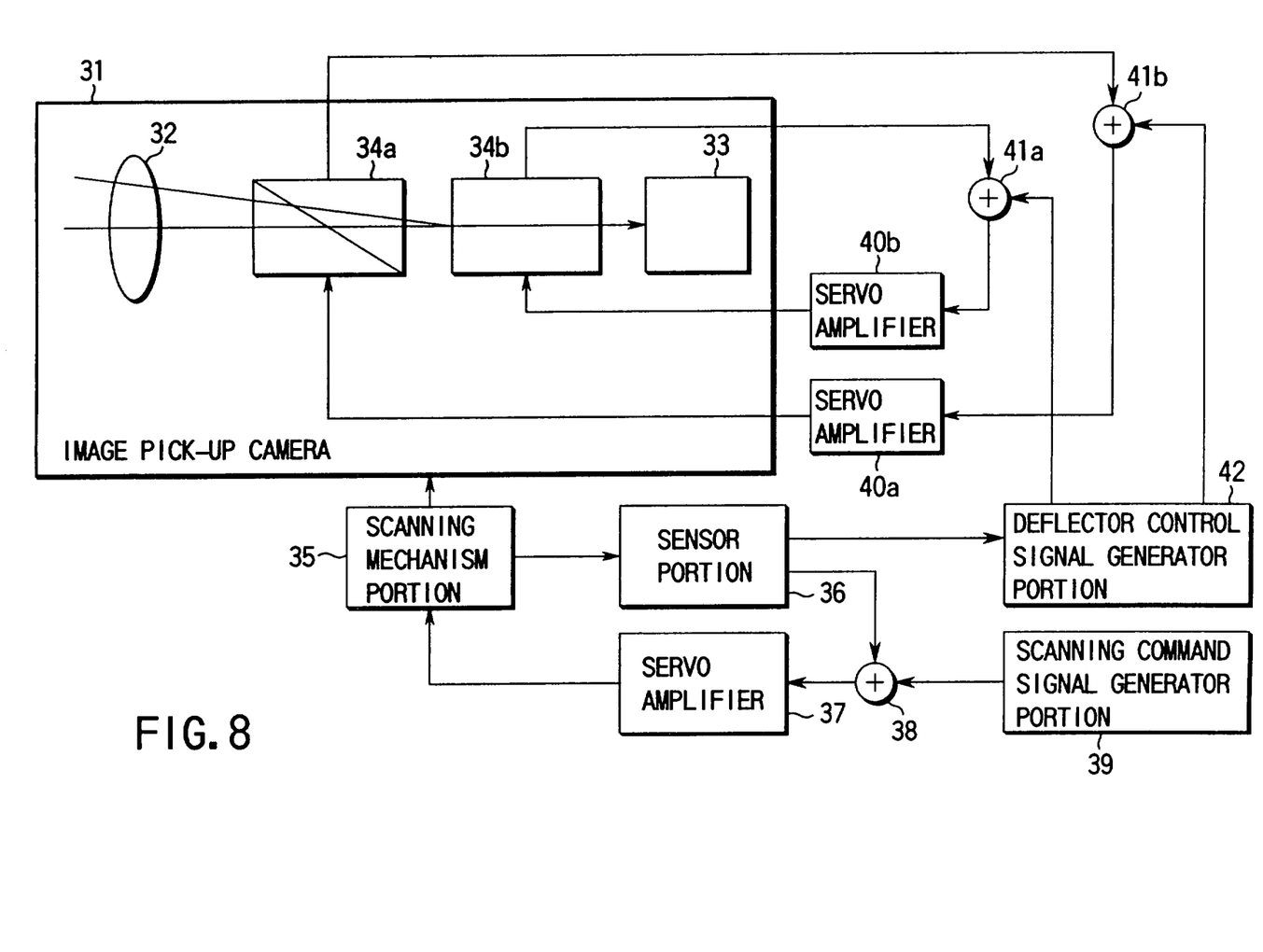
FIG. 8 is a block diagram showing a structure of a third embodiment of a scanning type image pick-up apparatus according to the present invention.

FIG. 8 shows a structure of a third embodiment of a scanning type image pick-up apparatus according to the present invention. Note that those components of FIG. 8 which are the same as those of FIG. 6 are referred to by the same reference symbols and only those portions which are different from those of FIG. 6 will be specifically described below.

The scanning mechanism portion 35 according to the present embodiment causes an image pick-up camera 31 to scan two-dimensional directions (which are a horizontal direction and a vertical direction, for example) and a sensor portion 36 detects a scanning angle in each of the directions.

Meanwhile, the image pick-up camera 31 is constructed by arranging a converging lens 32, a first electro-optical deflector 34a, a second electro-optical deflector 34b, and a charge storage type image pick-up element 33 on an optical axis. Light waves taken in are converged by the converging lens 32. The light waves converged are deflected in a direction opposite to the horizontal scanning direction by the first electro-optical deflector 34a and are deflected in a direction opposite to the vertical scanning direction by the second electro-optical deflector 34b. Thereafter, the light waves are imaged on the image pick-up element 33, thereby to obtain a static view image.

In this case, a deflector control signal generator portion 42 controls the first electro-optical deflector 34a so as to perform deflection in a direction opposite to the horizontal scanning direction at an equal angle speed through an adder 41a and a servo amplifier 40a, and also controls the second electro-optical deflector 34b so as to perform deflection in a direction opposite to the vertical scanning direction through an adder 41b and a servo amplifier 40b.

As is apparent from the above, the scanning type image pick-up apparatus according to the present embodiment has an independent electro-optical deflector for each of the horizontal and vertical directions, so that corrections can independently made in both the horizontal and vertical directions. Therefore, an image flow can be restricted independently in both the horizontal and vertical directions by independently feeding back the angle speeds in the horizontal and vertical directions to the electro-optical deflectors 34a and 34b.

Figure 9:
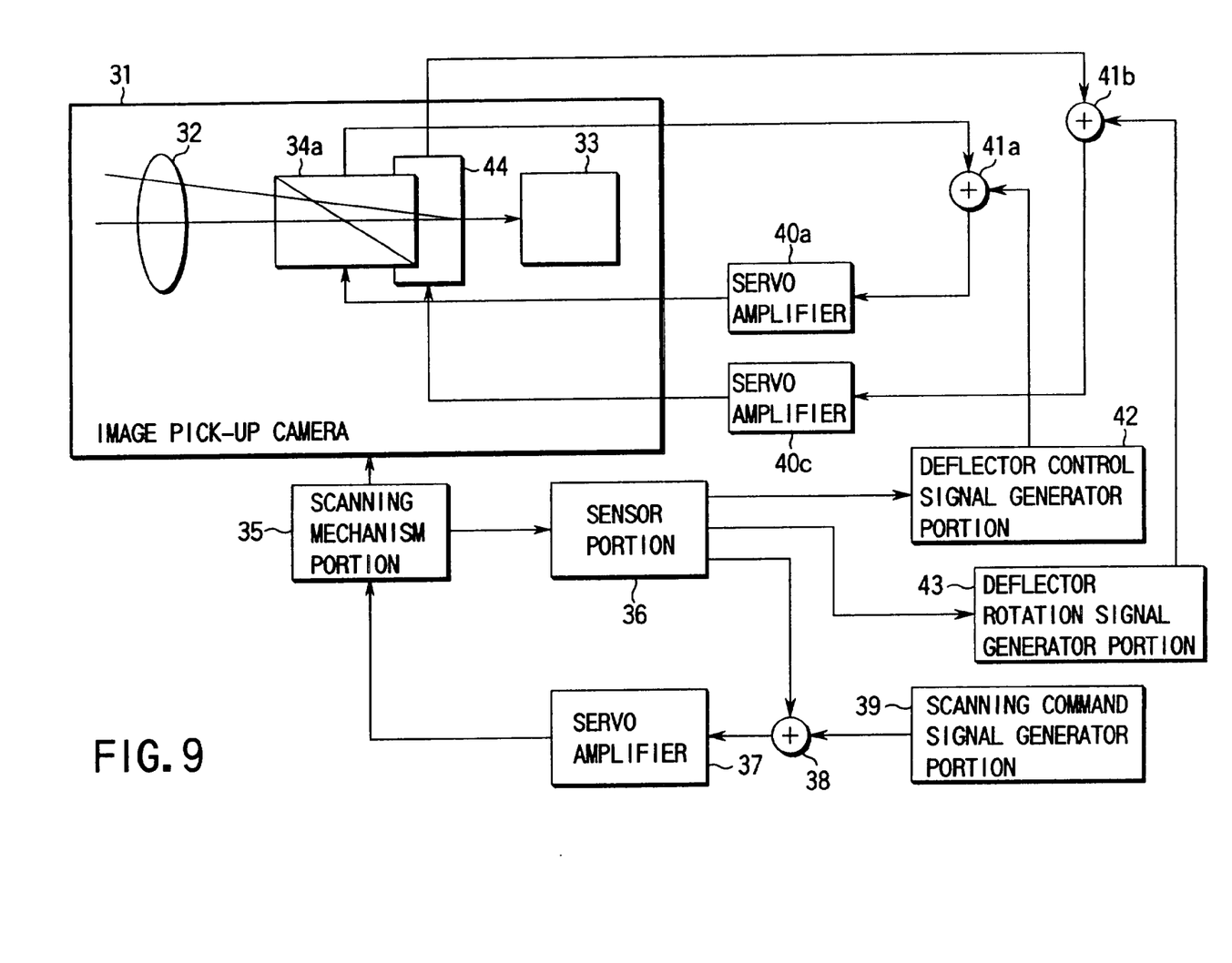
FIG. 9 is a block diagram showing a structure of a fourth embodiment of a scanning type image pick-up apparatus according to the present invention.

FIG. 9 shows a structure of a fourth embodiment of a scanning type image pick-up apparatus according to the present invention. Note that those components which are the same as those of FIG. 6 are referred to by the same reference symbols and only those components which are different from those of FIG. 6 will be specifically described below.

A scanning mechanism portion 35 causes an image pick-up camera 31 to scan two-dimensional directions (which are a horizontal direction and a vertical direction, for example) like in the third embodiment, and a sensor portion 36 detects a synthesis scanning angle speed concerning both of the directions.

Meanwhile, the image pick-up camera 31 is constructed by arranging a converging lens 32, an electro-optical deflector 34a, and a charge storage type image pick-up element 33 on an optical axis and by providing a rotation mechanism 44 for rotating the electro-optical deflector 34 around the optical axis. Light waves taken in are converged by the converging lens 32 and the light waves thus converged are deflected in a direction opposite to the scanning direction by the electro-optical deflector 34a. The light waves are thereafter imaged on the image pick-up element 33, thereby to obtain a static view image.

In this case, a deflector rotation signal generator portion 43, an adder 41c, and a servo amplifier 40c are provided for control and drive the rotation mechanism 44. The deflector rotation signal generator portion 43 drives the rotation mechanism 44 through the adder 41c and the servo amplifier 40c on the basis of synthesis angle speed data from the sensor portion 36, thereby to cause the deflection direction of the first electro-optical deflector 34b to correspond to the scanning direction, and the deflector control signal generator portion 42 controls the electro-optical deflector 34a so as to perform deflection in a direction opposite to the scanning direction at an equal angle speed through the adder 41a and the servo amplifier 40a.

As is apparent from the above, the scanning type image pick-up apparatus according to the present embodiment has an electro-optical deflector 34a which is freely rotatable around an optical axis and the electro-optical deflector 34a is rotated and controlled such that the moving direction of an image corresponds to the deflection direction of light waves. Specifically, the angle speeds in the horizontal and vertical directions are synthesized with each other thereby to obtain the scanning direction and the scanning angle speed of the image pick-up camera 31. The signal concerning the scanning direction is fed back to control rotation of the electro-optical deflector 34a around the optical axis and the signal concerning the scanning angle speed is fed back to control the deflection amount of light waves. Therefore, an image flow can be restricted both in the horizontal direction and the vertical direction.

As described above, according to the structures of the third and fourth embodiments, a scanning type image pick-up apparatus can realize restriction of an image flow without use of a mechanical operating portion. In addition, it is possible to realize a scanning type image pick-up apparatus whose scanning direction is not limited to one direction.

Further, since not only the deflection amount but also the deflection direction can be controlled electrically, it is possible to carry out easily such control which has been difficult to realize by a mechanical means, e.g., inversion of the phase in accordance with inversion of the rotation direction by reciprocal scanning.

Note that the image pick-up camera 31 may be replaced with a laser radar and a laser beam receiver may be used in place of the image pick-up element 10c in case of applying the third or fourth embodiments to a scanning type laser beam receive apparatus.

As has been specifically described above, according to the present invention, it is possible to provide a scanning type image pick-up apparatus and a scanning type laser beam receive apparatus which are capable of obtaining a clear view image over a wide view field and realize highly reliable search with high precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A scanning type image pick-up apparatus comprising:
   an image pick-up camera including an optical system for converging a light wave, an electro-optical deflector for electrically deflecting an optical path of the light wave in a specific direction, and an image pick-up element for forming an image of the light wave on an imaging surface by the optical system through the electro-optical deflector and converting the image into an electrical signal;
   scanning unit configured to cause the image pick-up camera to linearly scan a view range; and
   deflection control unit configured to control the electro-optical deflector to deflect the optical path in a direction opposite to a scanning direction of the scanning unit and at an angle and a speed decided by a scanning angle speed of the scanning unit, thereby restricting an image flow of the imaging surface caused by scanning of the scanning unit.

2. A scanning type image pick-up apparatus according to claim 1, where the second optical system is provided so as to correspond to a focus plane of the first optical system.

3. The apparatus according to claim 1, wherein the angle decided by the scanning angle speed is equivalent to an angle corresponding to a movement amount in the scanning direction.

4. The apparatus according to claim 1, wherein a light movement angle on a focus plane of the charge storage type image pick-up element is constant during an exposure time of the charge storage type image pick-up element.

5. A scanning type laser beam optical receiving apparatus comprising:
   a laser radar including an optical system for converging a laser beam, an electro-optical deflector for electrically deflecting an optical path of the light wave in a specific direction, and a laser beam receiver for forming an image of the laser beam on an acceptance surface by the optical system through the electro-optical deflector and converting the image into an electrical signal;
   scanning unit configured to cause the laser radar to linearly scan a view range; and
   deflection control unit configured to control the electro-optical deflector to deflect the optical path in a direction opposite to a scanning direction of the scanning unit and at an angle and a speed decided by a scanning angle speed of the scanning unit, thereby restricting an image flow of the acceptance surface caused by scanning of the scanning means unit.

6. A scanning type laser beam receive apparatus according to claim 5, wherein the second optical system is provided so as to correspond to a focus plane of the first optical system.

7. The apparatus according to claim 5, wherein the angle decided by the scanning angle speed is equivalent to an angle corresponding to a movement amount in the scanning direction.

8. The apparatus according to claim 5, wherein a light movement angle on a focus plane of the laser beam receiver is constant during an exposure time of the laser beam receivers.

* * * * *